United States Patent
Mensing

(10) Patent No.: US 7,784,051 B2
(45) Date of Patent: Aug. 24, 2010

(54) COOPERATIVE SCHEDULING USING COROUTINES AND THREADS

(75) Inventor: Joerg W. Mensing, Berlin (DE)

(73) Assignee: SAP AG, Walldorf (DE)

( * ) Notice: Subject to any disclaimer, the term of this patent is extended or adjusted under 35 U.S.C. 154(b) by 1314 days.

(21) Appl. No.: 11/282,504

(22) Filed: Nov. 18, 2005

(65) Prior Publication Data
US 2007/0118836 A1 May 24, 2007

(51) Int. Cl.
*G06F 9/46* (2006.01)
*G06F 9/30* (2006.01)

(52) U.S. Cl. .................... 718/103; 718/1; 718/102; 712/220

(58) Field of Classification Search ............. 718/103, 718/102, 1; 712/220
See application file for complete search history.

(56) References Cited

U.S. PATENT DOCUMENTS

| | | | | |
|---|---|---|---|---|
| 3,665,421 | A * | 5/1972 | Rehhausser et al. | 711/214 |
| 5,276,879 | A * | 1/1994 | Barry et al. | 718/106 |
| 5,455,951 | A * | 10/1995 | Bolton et al. | 718/103 |
| 6,035,321 | A * | 3/2000 | Mays | 718/103 |
| 6,653,933 | B2 * | 11/2003 | Raschke et al. | 370/203 |
| 6,654,781 | B1 * | 11/2003 | Browning | 718/104 |
| 6,922,745 | B2 * | 7/2005 | Kumar et al. | 710/200 |
| 7,007,015 | B1 * | 2/2006 | Nayak | 707/4 |
| 7,007,244 | B2 * | 2/2006 | Pankovcin | 715/853 |
| 7,325,233 | B2 * | 1/2008 | Kuck et al. | 718/103 |
| 7,487,503 | B2 * | 2/2009 | Accapadi et al. | 718/103 |
| 2005/0081016 | A1 * | 4/2005 | Sakai et al. | 712/1 |

OTHER PUBLICATIONS

Henderson, Ken, "Inside the SQL Server 2000 User Mode Scheduler", Feb. 24, 2004, © 2005 Microsoft Corporation. [Retrieved Nov. 17, 2005]. Retrieved from Internet: URL: http://www.msdn.microsoft.com/library/en-us/dnsqldev/html/sqldev_02252004.asp > 7 Pages.

* cited by examiner

*Primary Examiner*—Meng-Ai An
*Assistant Examiner*—Blake Kumabe
(74) *Attorney, Agent, or Firm*—Buckley, Maschoff & Talwalkar LLC

(57) ABSTRACT

A database system may provide definition of a first plurality of tasks associated with coroutine execution, and a second plurality of tasks associated with task-specific thread execution. Also provided may be spawning of a control thread and a plurality of threads, each of the plurality of threads associated with one of the second plurality of tasks, and running of the control thread to determine if a task of the first plurality of tasks and the second plurality of tasks is associated with coroutine execution or with task-specific thread execution. If the task is determined to be associated with coroutine execution, the control thread may be run to swap a coroutine context of the control thread with a coroutine context of the task. If the task is determined to be associated with thread execution, the control thread may be run to resume a thread associated with the task and to suspend the control thread.

25 Claims, 7 Drawing Sheets

COOPERATIVE SCHEDULING USING COROUTINES AND THREADS

FIELD

Some embodiments relate to systems providing branched execution of computing tasks. In particular, some embodiments are associated with processes for using coroutines and threads to cooperatively execute various tasks.

BACKGROUND

A software application may include program code for performing two or more tasks. Although the tasks may exhibit various interdependencies, each task may generally be viewed as providing one or more dedicated functions. To optimize application efficiency and/or resource usage, the tasks may be executed by threads or within coroutines.

A thread is associated with a register set and an execution stack. A process is a container for one or more threads, each of which shares state information, memory address space, and other resources of the process. An operating system may schedule the threads of a multi-threaded process by running each thread during a dedicated processor timeslice. In addition, a multi-threaded process may control thread scheduling using timers, inter-thread signaling and/or other mechanisms.

Coroutines are associated with independent register sets and execution stacks. When a coroutine is called for the first time, execution begins at the beginning of its execution stack. Upon subsequent calls to the coroutine, execution resumes at a point from which the coroutine last called another coroutine. Accordingly, a coroutine may yield before its associated task is completed, and the task may be resumed by a subsequent call to the coroutine. A coroutine switch typically consumes less processor overhead than a thread switch, and may therefore provide faster task dispatching.

Coroutines cannot be properly used in conjunction with some programming languages or specific programming language features. For example, a task that is coded using C++ exception handling should not be executed within a coroutine since exception handling is not aware of coroutines. Such a C++ task may instead be executed using a dedicated thread. Conventional systems do not, however, provide cooperative scheduling of tasks executed by associated threads and tasks executed within coroutines. Accordingly, in order to cooperatively schedule the C++ task and a second task, the second task must be executed by an associated thread.

However, it may be desirable to execute the second task within a coroutine, particularly in a case that the second task is coded in a coroutine-compliant language and improved execution time is desired. More generally, systems are needed for efficiently scheduling tasks executed by associated threads and tasks executed within coroutines.

DETAILED DESCRIPTION

Figure 1:
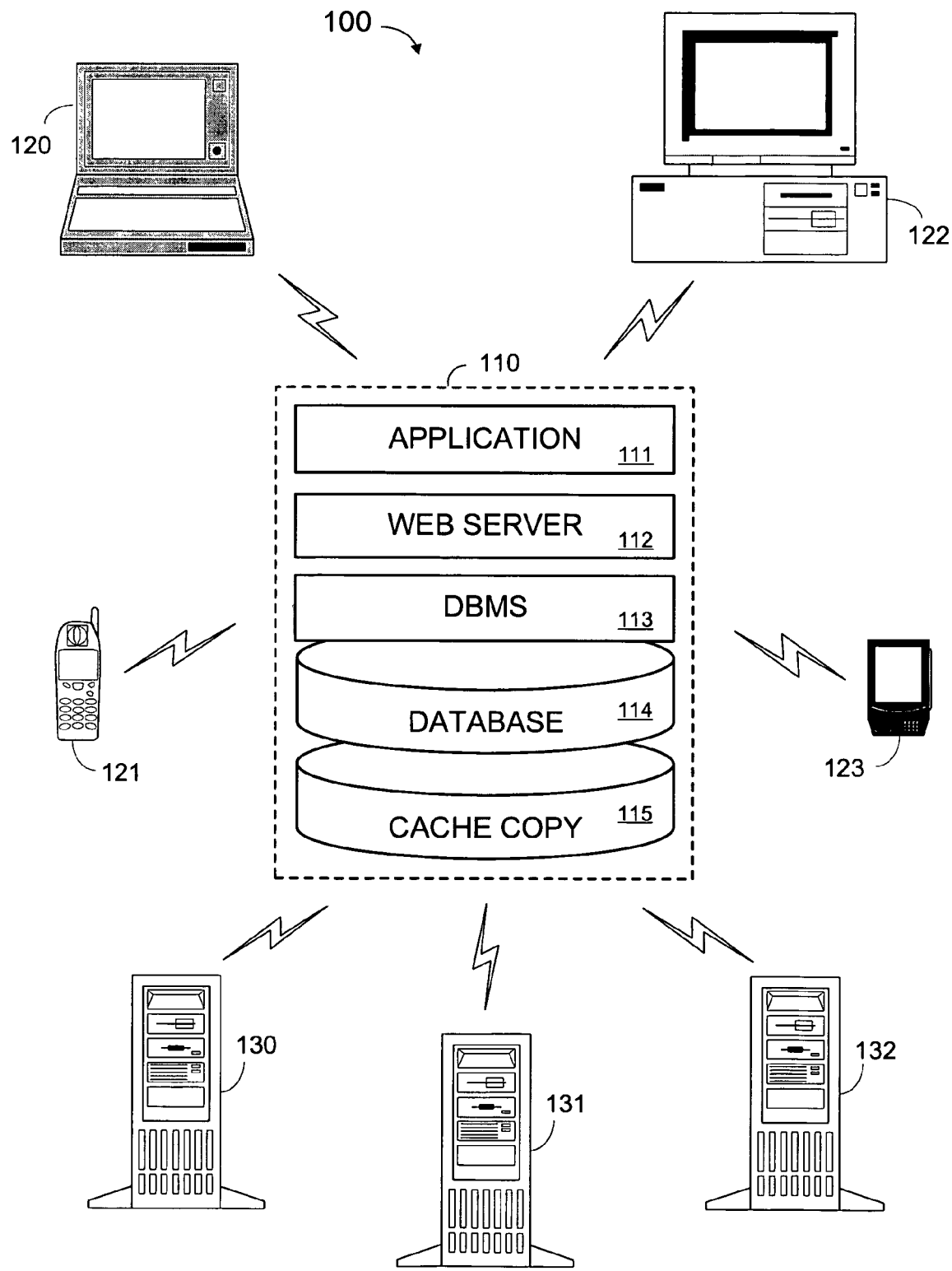
FIG. 1 is a block diagram of a system topology according to some embodiments.

FIG. 1 is a block diagram of system 100 according to some embodiments. It should be noted that other system topologies may be used in conjunction with other embodiments. System 100 illustrates a client-server database environment including application/database server 110, client devices 120 through 123, and data sources 130 through 132.

Server 110 may operate to receive, store, manage and provide data. Such data may be received from sources such as data sources 130 through 132 and/or generated by server 110. The data may be provided to client devices 120 through 123 in response to requests received therefrom.

Server 110 of system 100 includes application 111, Web server 112, database management system (DBMS) 113, database 114 and cache copy 115. Application 111 may provide business monitoring, inventory control, online shopping, and/or any other suitable functions that are or become known. Application 111 may comprise program code for communicating with Web server 112 and DBMS 113, and for using data stored in database 114.

Web server 112 may manage data communication between server 110 and one or more of client devices 120 through 123 and data sources 130 through 132. According to some embodiments, the one or more devices or sources execute a Web browser and/or one or more Java applets to interact with Web server 112.

DBMS 113 may comprise any system for managing a database instance that is or becomes known. DBMS 113 may receive requests such as Structured Query Language (SQL) requests, may retrieve requested data from database 114, and may return the requested data to the requester. DBMS 113 may also perform management, optimization, monitoring and other database-related tasks.

Database 114 may comprise one or more disparate systems for storing data, therefore DBMS 113 may comprise one or more systems for retrieving stored data. According to some embodiments, database 114 is implemented as any suitable collection of data that may be accessed by a computer program to select particular data from the collection.

The data of database 114 may include data records and associated index entries (i.e. application data), as well as configuration files, database parameters, paths, user information and any other suitable information. In some embodiments, database 114 is an element of an Online Transaction Processing (OLTP) database instance. An OLTP database instance may be suited for processing individual transactions quickly within an environment consisting of a large number of users and a large database.

During database execution, various elements of the database are stored in a cache. These elements may include recently-accessed pages of application data, database catalog objects and/or a log queue. Cache copy 115 comprises a copy of all or a portion of the cache. Cache copy 115 may comprise a LIVECACHE™ database instance that facilitates object-oriented manipulation of the copied cache data.

Some tasks associated with an OTLP database instance may benefit from execution within a coroutine, while tasks associated with a LIVECACHE™ database instance may not be suitable for execution within a coroutine. For example, the tasks associated with the LIVECACHE™ database instance may be coded using language features that are incompatible with coroutines. In view of the foregoing, some embodiments of DBMS 113 include program code to cooperatively schedule tasks executed by associated threads and tasks executed within coroutines. Examples of such scheduling are set forth in detail below.

Server 110 may include other unshown elements that may be used during operation thereof, such as any suitable program code, scripts, or other functional data that is executable to interface with other elements of system 100, other applications, other data files, operating system files, and device drivers. These elements are known to those skilled in the art, and are therefore not described in detail herein.

Client devices 120, 121, 122 and 123 are illustrated as a laptop computer, a telephone, a desktop computer, and a personal digital assistant, respectively. Generally, each of client devices 120 through 123 may comprise any combination of hardware and/or software for communicating with server 110. This communication may comprise transmitting a request for information to server 110 and receiving a response including data from database 114. Client devices 120 through 123 may include any suitable client application such as a Web browser or a Java applet. In this regard, client devices 120 through 123 may be connected to server 110 through the Internet or through an Intranet.

Data sources 130 through 132 may comprise any sources of any data that may provide data to server 110. The data may be pushed to server 100 and/or provided in response to queries received therefrom. One or more of data sources 130 through 132 may comprise a back-end data environment employed in a business or industrial context. Data sources 130 through 132 may therefore comprise many disparate hardware and software systems, some of which are not interoperational with one another.

Two or more of the elements of system 100 may be located remote from one another and may communicate with one another via a network 120 and/or a dedicated connection. Moreover, each displayed element of system 100 may comprise any number of hardware and/or software elements, some of which are located remote from each other.

Elements described herein as communicating with one another are directly or indirectly capable of communicating over any number of different systems for transferring data, including but not limited to a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP). Communication network 120 may therefore comprise any communication media and protocols that are or become known.

Figure 2:
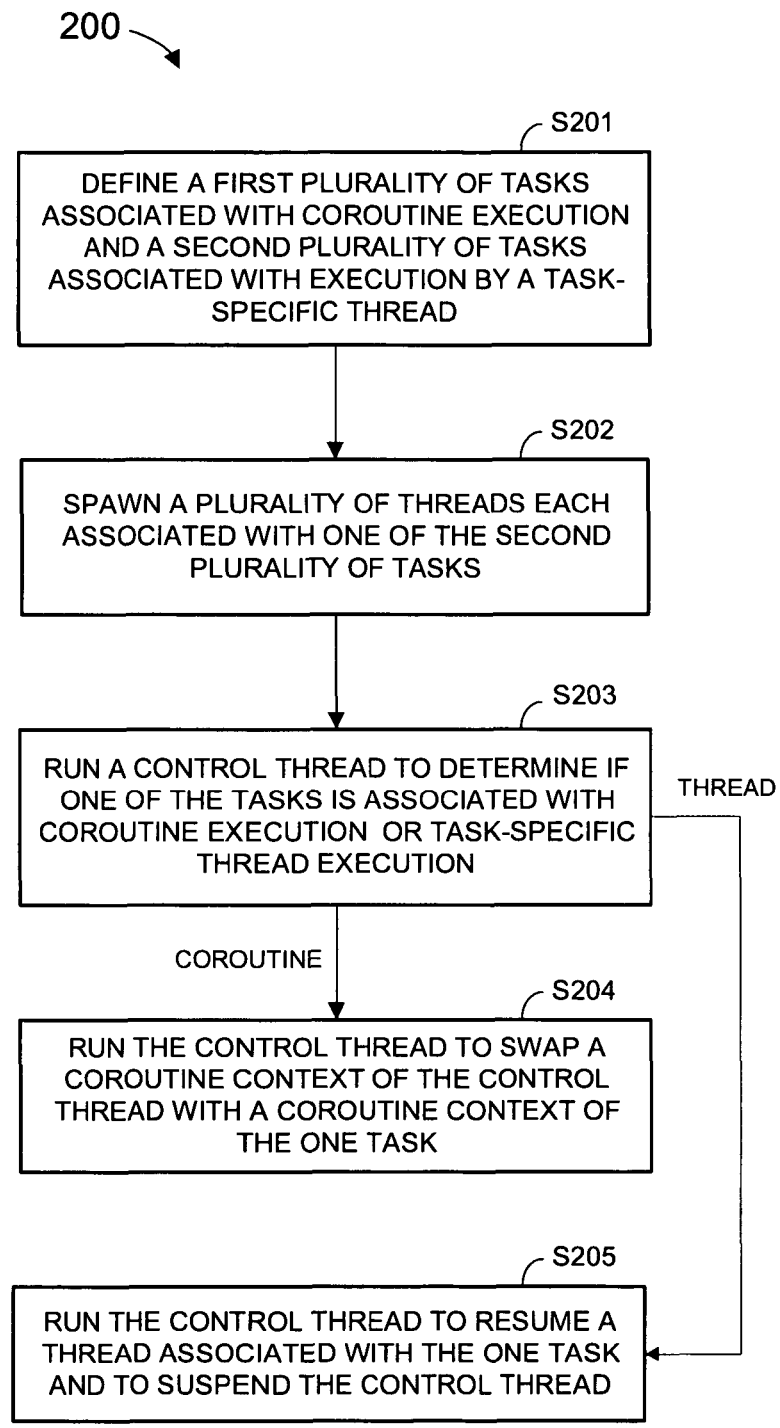
FIG. 2 is a flow diagram of program code to execute tasks according to some embodiments.

FIG. 2 is a flow diagram of process 200 according to some embodiments. Some embodiments of process 200 may provide cooperative scheduling of tasks executed by associated threads and tasks executed within coroutines. Process 200 and all other process mentioned herein may be embodied in processor-executable program code read from one or more of a computer-readable medium, such as a floppy disk, a CD-ROM, a DVD-ROM, a Zip™ disk, a magnetic tape, and a signal encoding the process, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

In some embodiments, server 110 executes program code of DBMS 113 to perform each of process 200. The following description of process 200 will therefore include examples of each of process 200 as performed by server 110.

A first plurality of tasks associated with coroutine execution and a second plurality of tasks associated with task-specific thread execution are initially defined at step S201. The tasks may be defined (i.e., configured) dynamically during initialization of DBMS 113 and database 114. More specifically, a kernel of DBMS 113 starts database 114 and creates a coordinator thread. The coordinator thread spawns various special threads and user kernel threads (UKTs) to perform tasks such as connecting to database 114, listening for SQL queries, processing SQL queries, handling I/O, and monitoring database 114.

Figure 3:
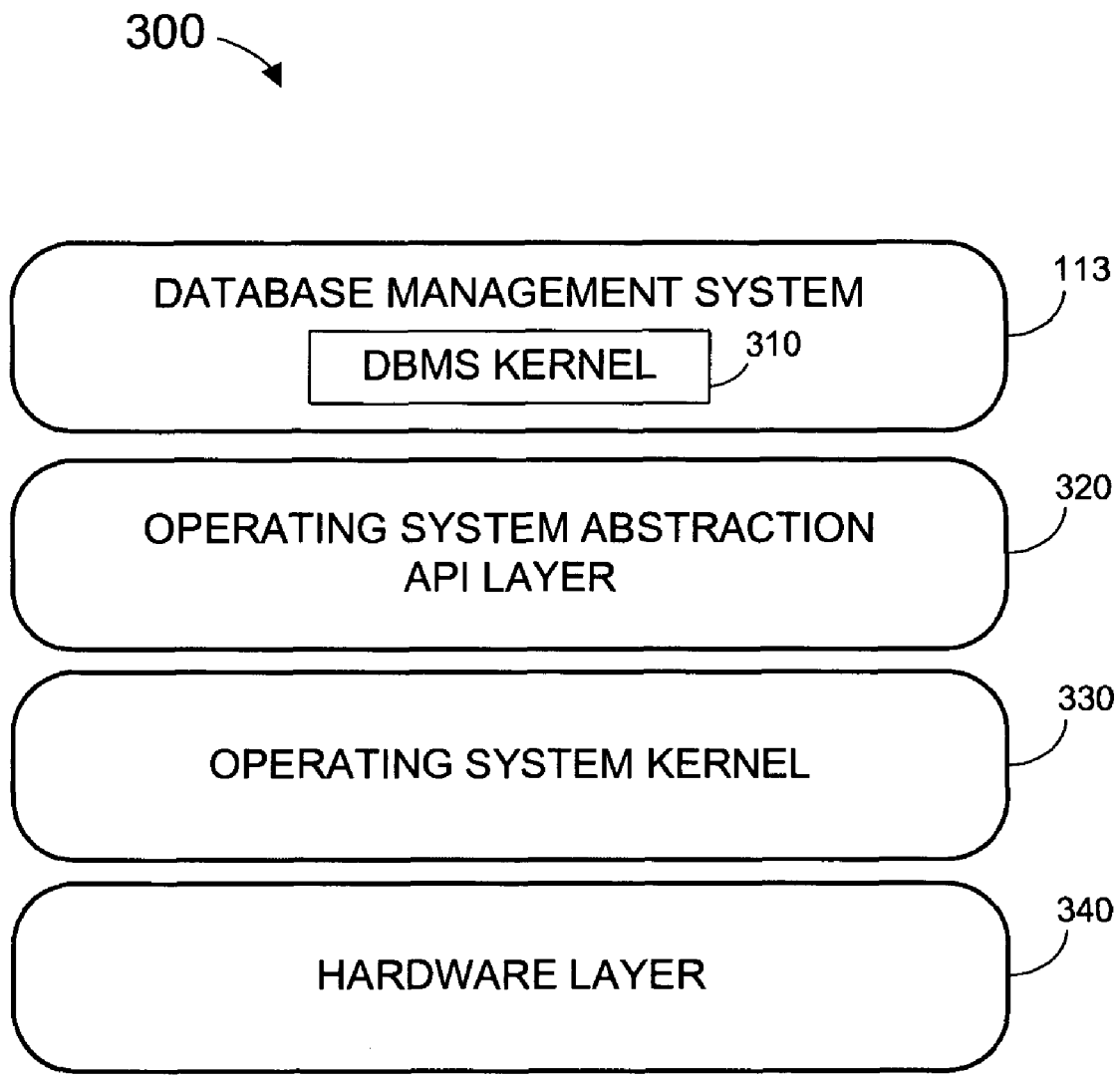
FIG. 3 is a block diagram of an architecture according to some embodiments.

FIG. 3 is a block diagram of architecture 300 of server 110 illustrating kernel 310 of DBMS 113 according to some embodiments. Embodiments are not limited to architecture 300, and architecture 300 may be implemented in any currently- or hereafter-known manner. For example, each illustrated software element may be embodied as services, layers, and/or core components of an associated operating environment, and/or may be embodied by any other executable software component, including a dynamic link library or a stand-alone application.

Architecture 300 includes API layer 320 for exposing interfaces to DBMS 113 for communicating with operating system kernel 330. API layer 320 may provide interfaces for managing thread execution and context swaps. For example, interfaces exposed by API layer 320 may comply with a threads programming interface specified by the Institute of Electrical and Electronics Engineers Portable Operating System Interface (POSIX) 1003.1c standard, but embodiments are not limited thereto.

Operating system kernel 330 may comprise any suitable operating system kernel(s) provided by server 110. Non-exhaustive examples of operating system kernel 330 include UNIX™, LINUX™, and WINDOWS™-based kernels. Operating system kernel 330 provides control over hardware layer 340, which comprises hardware elements of server 110.

Returning to the present example of step S201, one of the user kernel threads may create two or more task control blocks in memory. The task control blocks include information associated with the first plurality of tasks and with the second plurality of tasks. Therefore, the tasks are defined in some embodiments of step S201 by creating task control blocks associated with each task.

Figure 4:
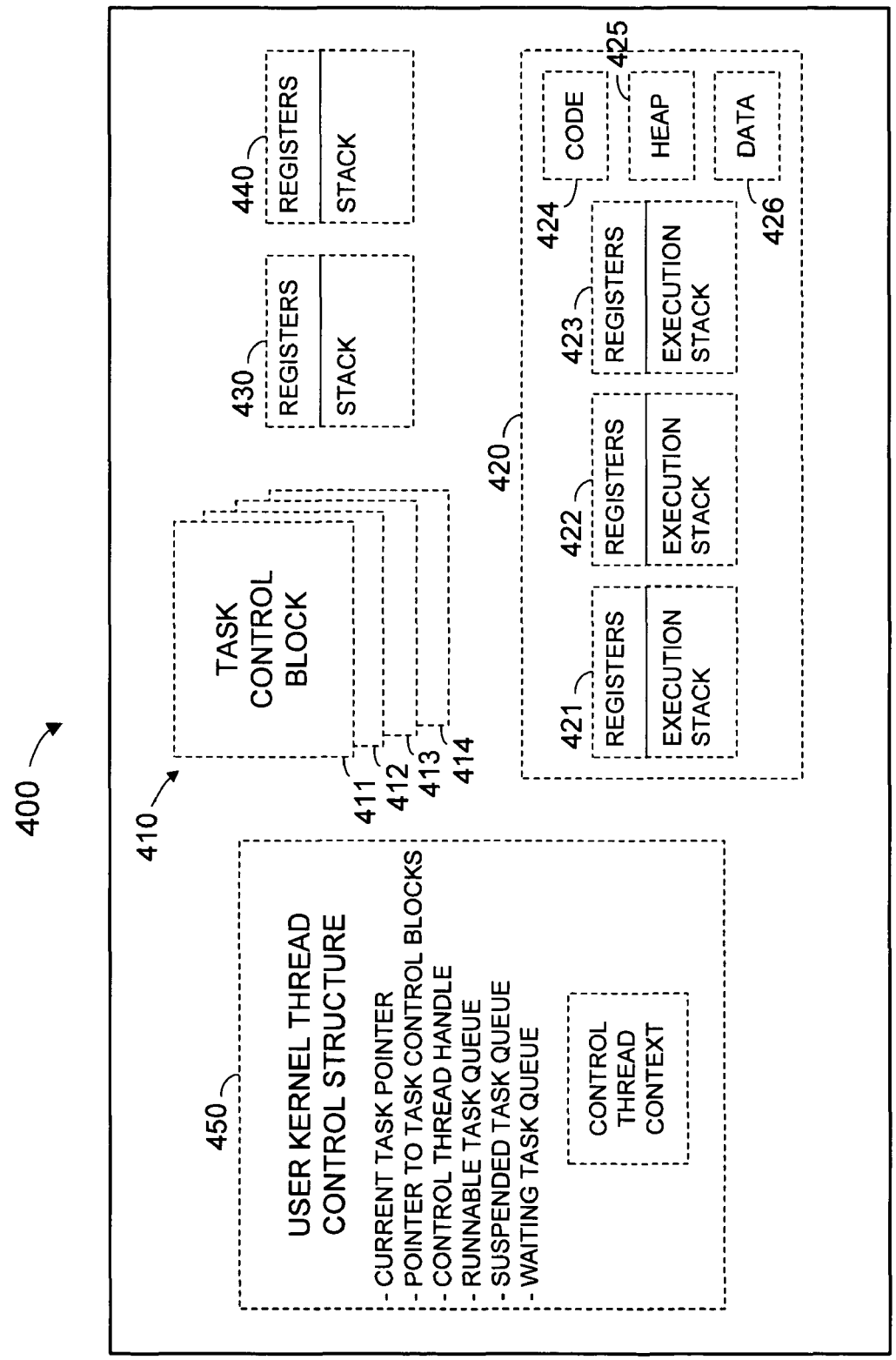
FIG. 4 is a diagram of memory structures according to some embodiments.

FIG. 4 is a block diagram of memory area 400 in which task control blocks may be created according to some embodiments. Memory area 400 does not necessarily represent a contiguous memory footprint. Rather, each represented memory structure may exist across one or more memory locations and/or across various types of physical memory (e.g., L1 cache, Double Data Rate Random Access Memory, hard disk).

In some embodiments, each of task control blocks 410 created at S201 is associated with a task. A task control block 410 includes a flag or other indicator indicating whether the associated task is associated with coroutine execution or task-specific thread execution. Also included is a pointer to either a thread structure or coroutine context associated with the task, depending on whether the task is associated with coroutine execution or task-specific thread execution. If a task is associated with task-specific thread execution, a task control block associated with the task may also include a thread Id identifying a task-specific thread to execute the task.

Memory 400 also includes process footprint 420 including thread structures 421, 422 and 423. Each of thread structures 421, 422 and 423 may be used to store an instruction pointer and data of a respective thread. Each respective thread may access code 424, heap 425 and data 426 of process footprint 420.

Thread structures 421, 422 and 423 may correspond to the aforementioned pointers stored in task control blocks 410. For example, task control block 411 may be associated with a particular task. Task control block 411 may indicate that the task is associated with task-specific thread execution and include a pointer to thread structure 421. Accordingly, thread structure 421 may be used to run a thread to execute the particular task. Similarly, task control block 412 may be associated with a task that is executed by a thread corresponding to thread structure 422.

Coroutine contexts 430 and 440 are also located in memory 400 and comprise a respective instruction pointer as well as an associated stack. Coroutine contexts 430 and 440 may also correspond to pointers of respective ones of task control blocks 410. For example, task control blocks 413 and 414 may correspond to tasks that are associated with coroutine execution and include pointers to coroutine contexts 430 and 440, respectively. As a result, the task associated with task control block 413 may be executed within coroutine context 430 and the task associated with task control block 414 may be executed within coroutine context 440.

UKT structure 450 may also be created in some embodiments of step S201. As illustrated in FIG. 4, UKT structure 450 may include a pointer to a currently-running task as well as a pointer to task control blocks 410. This latter pointer may comprise a pointer to task control block 411, which includes a pointer to task control block 412, which includes a pointer to task control block 413, which includes a pointer to task control block 414. As a result, each of task control blocks 410 may be accessed based on the task control block pointer of UKT structure 450.

UKT structure 450 also includes a coroutine context of a control thread and a control thread handle. Usage of a control thread according to some embodiments will be discussed in detail below.

Tasks queues are included in UKT structure 450 according to some embodiments. Each task in a task queue may be identified by a pointer to its associated task control block. The task queues may comprise a runnable task queue, a suspended task queue, and a waiting task queue. Such queues as well as other queues are known in the art of user-level task scheduling.

Returning to process 200, a plurality of threads is spawned at step S202. The threads may be spawned by a user kernel thread that was used to define the tasks at step S201 or by another thread. Each of the spawned threads is associated with one of the second plurality of tasks defined at step S201. More particularly, each spawned thread is earmarked to execute an associated one of the second plurality of tasks.

Continuing with the present example, a pointer to task control blocks 410 may be retrieved from UKT structure 450 at S202. Using the pointer, each of task control blocks 410 is analyzed to identify any task-specific threads defined therein. As described above, a task control block 410 includes a thread Id and/or a pointer to a thread data structure if the task control block 410 is associated with a task that is to be executed by a thread. Each of the spawned threads is suspended after being spawned at S202.

Next, at step S203, a control thread is run to determine if one of the tasks is associated with coroutine execution or task-specific thread execution. As mentioned above, the control thread may be run using the associated handle and context within UKT structure 450. The control thread may comprise a user kernel thread that was used execute one or both of steps S201 and S202.

The task examined at step S203 may comprise a highest-priority task of the runnable task queue of UKT structure 450. Accordingly, UKT structure 450 may initially be accessed to identify the task. A task control block 410 of the identified task is then accessed to determine if the task is associated with coroutine execution or task-specific thread execution. As mentioned above, such an association may be indicated by a flag or the like.

If the task is associated with coroutine execution, the control thread is run at S204 to swap a coroutine context of the control thread with a coroutine context of the one task. Such a context swap is known in the art, and may rely on an interface provided by API layer 320. In some embodiments, the context swap requires a pointer to a coroutine context (e.g., coroutine contexts 430 or 440) of the one task. The pointer may be determined from a task control block 410 that is associated with the one task.

If the task is determined to be associated with task-specific thread execution, the control thread is run at S205 to resume a thread associated with the task and to suspend the control thread. Process 200 terminate at step S204 or step S205.

Figure 5:
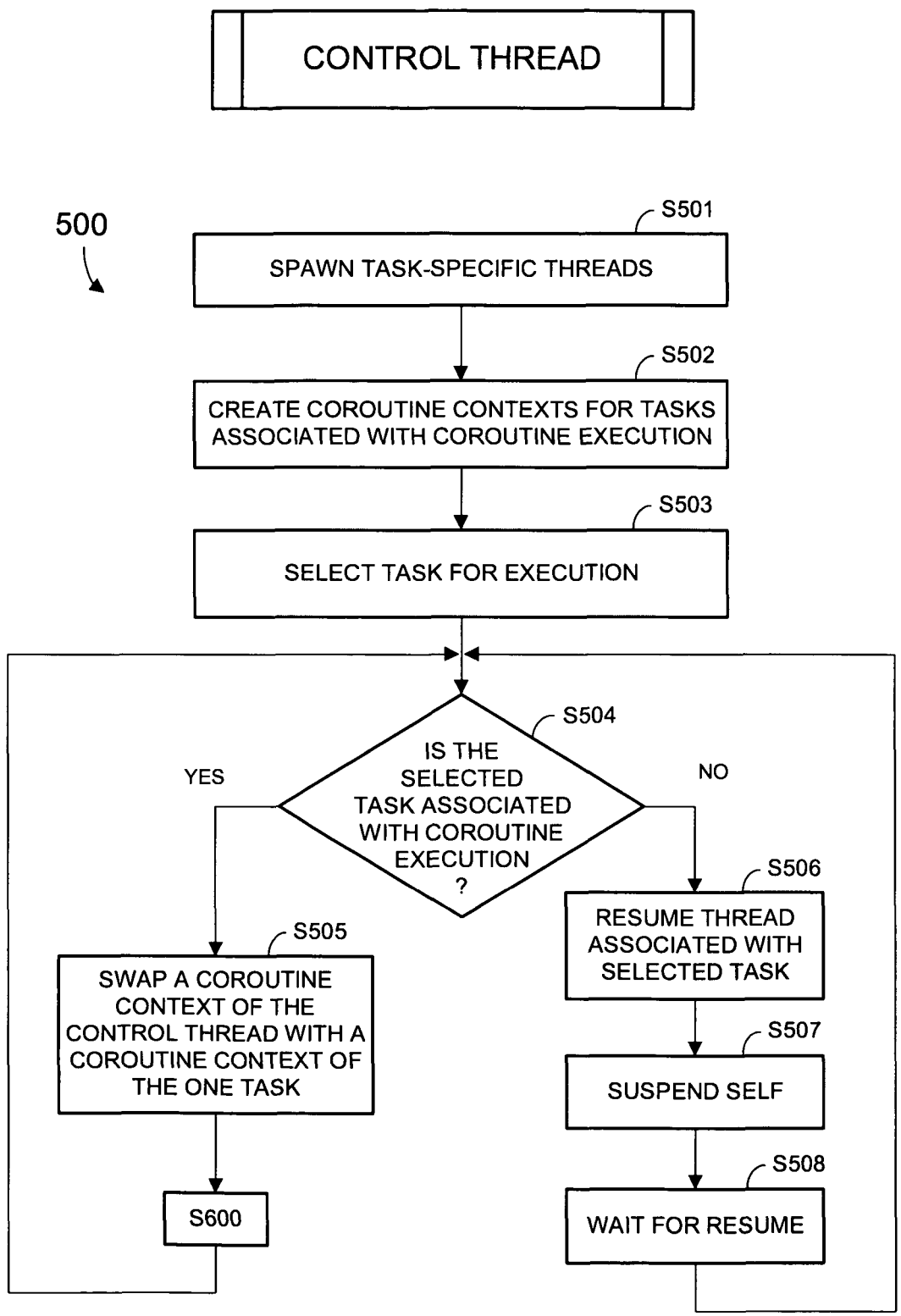
FIG. 5 is a flow diagram of program code executed by a control thread according to some embodiments.
Figure 6:
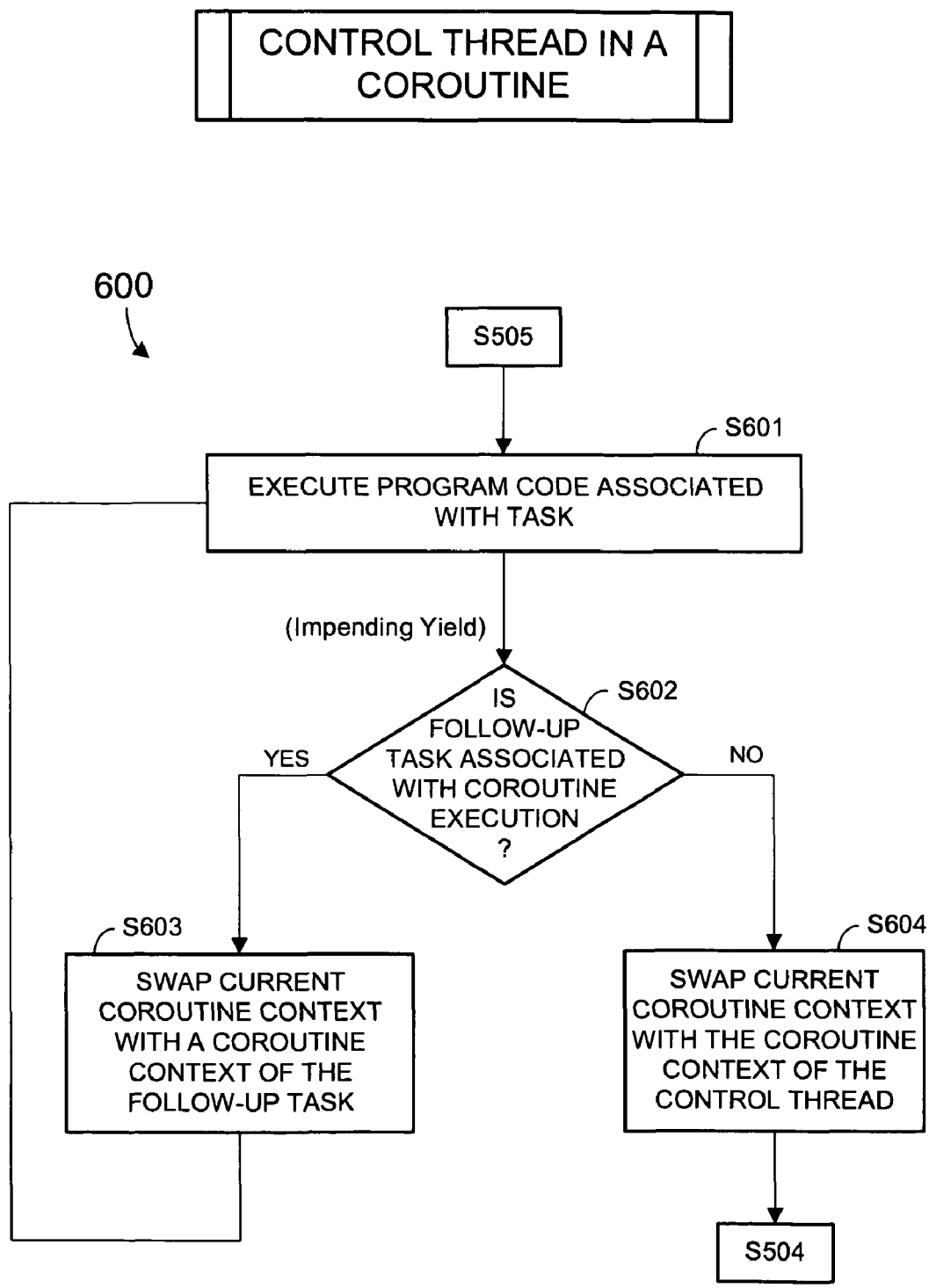
FIG. 6 is a flow diagram of program code executed by a task-specific thread according to some embodiments.
Figure 7:
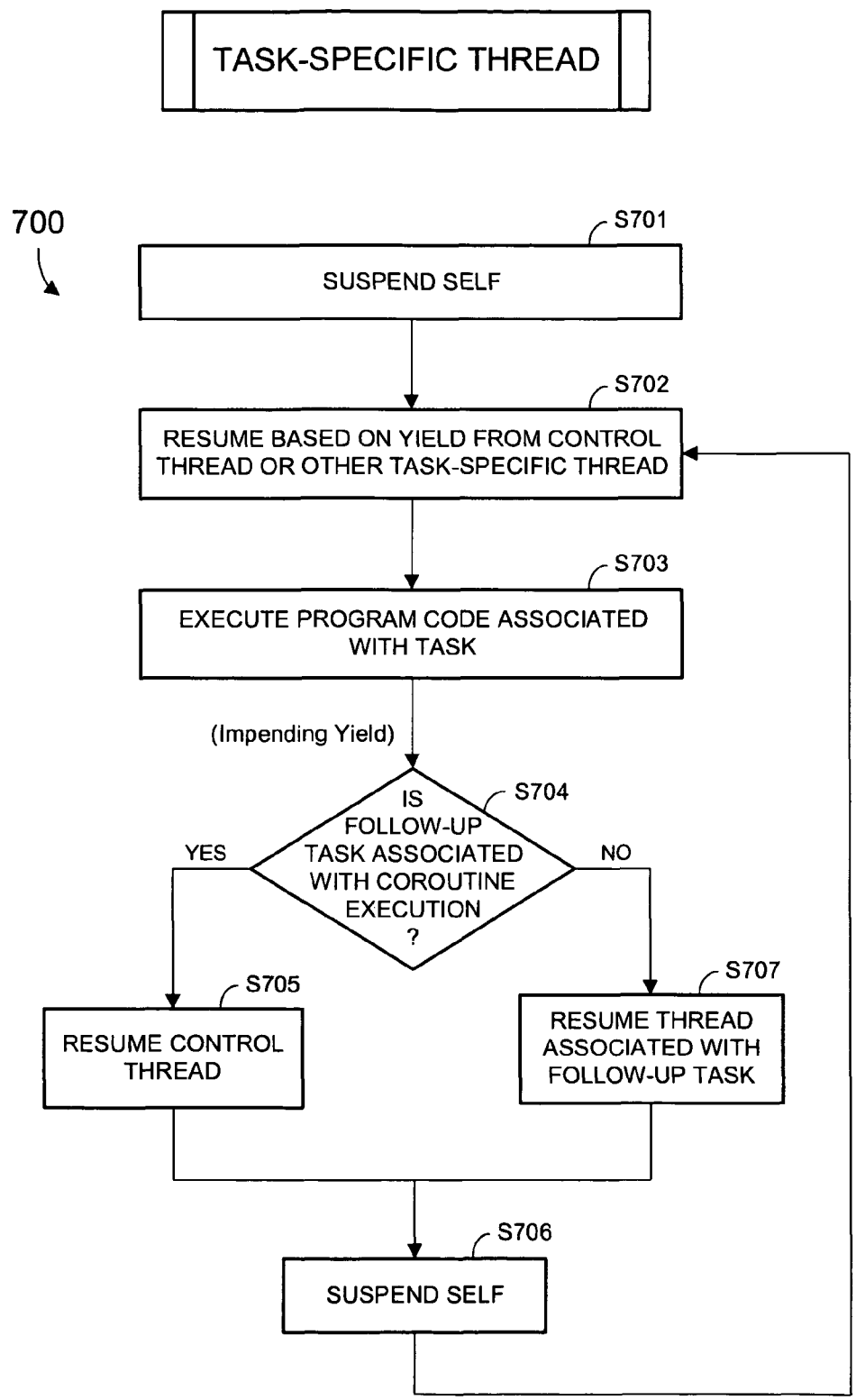
FIG. 7 is a flow diagram of program code executed as a coroutine by a control thread according to some embodiments.

FIGS. 5 through 7 are flow diagrams corresponding to some embodiments and generally reflect an implementation of process 200. More particularly, FIG. 5 includes steps that may be performed by a control thread to schedule tasks. FIG. 6 illustrates steps performed by a task-specific thread to execute a scheduled task and FIG. 7 illustrates steps performed by the control thread to execute a scheduled task within a coroutine.

Beginning with process 500, a control thread spawns task-specific threads at step S501. The control thread may comprise a user kernel thread that may be used to perform steps in addition to those illustrated in FIG. 5. For example, the control thread may also be used to define a first plurality and a second plurality of tasks as described with respect to step S201 of process 200.

One thread is spawned for each task that is to be executed by a task-specific thread. These tasks may be identified to the control thread in any suitable manner. For example, the control thread may spawn a thread for each one of task control blocks 410 that includes a thread Id and/or a pointer to a thread data structure.

The spawned threads are then suspended using any technique for suspending a thread that is or becomes known. A thread is suspended in a manner that allows another thread to resume the suspended thread. For example, some embodiments employ condition variables, mutexes, and predicates to suspend the threads and to allow any running thread to resume any suspended thread. Thread suspension, as well as thread spawning, may be implemented by calling an appropriate interface provided by API layer 330.

Next, at step S502, the control thread creates coroutine contexts for tasks that are associated with coroutine execution. According to some embodiments, a coroutine context may be created for each task that is represented in task control blocks 410 and that is associated with coroutine execution. Coroutine contexts 430 and 440 are examples of coroutine contexts that may be created at step S502. The control thread may create a coroutine context by calling a create interface of API layer 330.

The control thread selects a task for execution at step S503. In some embodiments, the selected task is a highest-priority task of the aforementioned runnable task queue. Accordingly, the control thread may access UKT control structure 430 at step S503 to identify the highest-priority task of the runnable task queue.

The control thread then determines, at step S504, whether the selected task is associated with coroutine execution. Some embodiments of step S504 may comprise retrieving a pointer to task control blocks 410 from UKT structure 450, using the pointer to access a task control block 410 associated with the selected task, and retrieving an indicator from the task control block 410 that indicates whether the selected task is associated with coroutine execution.

If the task is associated with coroutine execution, the control thread swaps a coroutine context of the control thread with a coroutine context of the one task at S505. The control thread may perform the swap by retrieving the control thread handle from UKT structure 450 and a pointer to the coroutine context of the selected task from the associated task control block 410, and by passing the retrieved pointer and the control thread handle to an interface provided by API layer 320.

By virtue of the swap, the control thread continues to run and executes the selected task within a new coroutine. Process 600 illustrates an execution sequence of the control thread for executing a selected task within a coroutine according to some embodiments.

Initially, the control thread executes program code associated with the task at S601. More particularly, the control thread may execute instructions based on an instruction pointer of the associated coroutine context. The present task must, by definition yield to another task at some point during S601. The yield may be performed for any suitable reason that is or becomes known.

Prior to yielding, the control thread determines at S602 whether a follow-up task is associated with coroutine execution. The follow-up task may comprise a highest-priority runnable task of the aforementioned runnable task queue. In some embodiments, the control thread may call a routine to save the current task pointer, to identify the follow-up task from UKT structure 450 and replace the current task pointer of UKT structure 450 with a pointer to the follow-up task. The control thread may then retrieve a pointer to task control blocks 410 from UKT structure 450, use the pointer to access a task control block 410 associated with the follow-up task, and retrieve an indicator from the accessed task control block 410 that indicates whether the follow-up task is associated with coroutine execution.

The control thread swaps a coroutine context of the current task with a coroutine context of the follow-up task at S603 if the control thread determines that the follow-up task is associated with coroutine execution at S602. As described with respect to step S505, the control thread may perform the swap by retrieving a pointer to the coroutine context of the follow-up task from the associated task control block 410, and by passing the retrieved pointer and a pointer to the current coroutine context to an interface provided by API layer 320. Flow then returns to S601 to execute program code associated with the follow-up task and flow continues as described above.

Flow proceeds from S602 to S604 if it is determined that the follow-up task is to be executed by an associated task-specific thread. At S604, the control thread swaps a coroutine context of the current task with a coroutine context of the control thread (i.e., the coroutine context of the process 500 task). Flow then returns to S504.

Continuing with the present example, the control thread determines at S504 that the selected task is not associated with coroutine execution. In this regard, the previously-mentioned follow-up task has become the selected task due to the above-described change to the current task pointer of UKT structure 450. Accordingly, flow proceeds from S504 to S506.

The control thread resumes a thread associated with the selected task at S506. The resumed thread is a task-specific thread that was spawned at S501. The control thread may resume the task-specific thread using any currently- or hereafter-known interthread signaling mechanism(s). The mechanisms include, but are not limited to, mutexes, semaphores, condition variables, predicates, and thread Ids. One of task control blocks 410 associated with the selected task may include information used by the control thread to resume the associated thread.

The control thread suspends itself at S507 after resuming the task-specific thread at S506. Next, at S508, the control thread waits to be resumed by another thread, which may or may not be identical to the thread resumed at S506. While the control thread waits at S508, the resumed thread may execute its associated task as illustrated by process 700 of FIG. 7.

Flow for a task specific thread begins at S701, at which point the thread suspends itself after being spawned by the control thread. Next, at S702, the thread resumes based on a yield or other action performed by the control thread as mentioned with respect to S506, or by another task-specific thread.

The thread then executes program code associated with the task at S703. For example, one of thread structures 421, 422 and 423 may be used in conjunction with code 424, heap 425 and data 426 to execute program code of the current task. A task control block 410 associated with the task may indicate which one of thread structures 421, 422 and 423 is to be used to execute the task.

Next, at S704, and prior to yielding, the thread determines whether a follow-up task is associated with coroutine execution. The determination may proceed as described above with respect to the control thread and S603. If the follow-up task is associated with coroutine execution, the control thread is resumed at S705 and the current thread suspends itself at S706. The control thread then resumes running at S504 as described above.

If the current thread determines at S704 that the follow-up task is not associated with coroutine execution, then the follow-up task must be associated with task-specific thread execution. The current thread therefore resumes a thread associated with the follow-up task at S707 and suspends itself at S706. More particularly, the current thread may access UKT structure 450 to identify a task control block 410 associated with the selected task, and may retrieve a thread Id, mutex, condition variable or the like needed to resume the thread associated with the follow-up task. The current thread may then resume at S702 upon a yield from another thread. In addition, the thread associated with the follow-up task may proceed to execute process 700 beginning at S702 as described above.

Generally, process 500, 600 and 700 allow the control thread to execute all tasks associated with coroutine execution, and allow other tasks to be executed by dedicated threads. According to some embodiments, the control thread is used to execute steps S503 through S508, and one or more other threads are used to execute steps S501 and S502.

The embodiments described herein are solely for the purpose of illustration. Those skilled in the art will recognize other embodiments may be practiced with modifications and alterations limited only by the claims.

What is claimed is:

1. A method comprising:
defining a first plurality of tasks associated with coroutine execution, and a second plurality of tasks associated with task-specific thread execution;
spawning a plurality of threads, each of the plurality of threads associated with one of the second plurality of tasks;
running a control thread to determine if a first task of the first plurality of tasks or the second plurality of tasks is associated with coroutine execution or with task-specific thread execution;
if the first task is determined to be associated with coroutine execution, running the control thread to swap a coroutine context of the control thread with a coroutine context of the task; and
if the first task is determined to be associated with thread execution, running the control thread to resume a first thread associated with the first task and to suspend the control thread.

2. A method according to claim 1,
wherein the first task is a highest-priority runnable task of the first plurality of tasks and the second plurality of tasks.

3. A method according to claim 1, further comprising:
running the control thread to execute program code associated with the first task.

4. A method according to claim 1, further comprising:
running the first thread to execute program code associated with the first task.

5. A method according to claim 1, further comprising:
running the first thread associated with the task to execute program code associated with the task;
running the first thread to determine if a second task of the first plurality of tasks or the second plurality of tasks is associated with coroutine execution or with task-specific thread execution;
if the second task is determined to be associated with coroutine execution, running the first thread to resume the control thread and to suspend the first thread; and
if the second task is determined to be associated with thread execution, running the first thread to resume a second thread associated with the second task and to suspend the first thread.

6. A method according to claim 5, further comprising:
running the control thread to execute program code associated with the second task.

7. A method according to claim 5, further comprising:
running the second thread to execute program code associated with the second task.

8. A method according to claim 1, further comprising:
running the control thread to execute program code associated with the first task;
running the control thread to determine if a second task of the first plurality of tasks or the second plurality of tasks is associated with coroutine execution or with task-specific thread execution;
if the second task is determined to be associated with coroutine execution, running the control thread to swap the coroutine context associated with the first task with the coroutine context of the second task; and
if the second task is determined to be associated with thread execution, running the control thread to swap the coroutine context of the first task with the coroutine context of the control thread.

9. A method according to claim 8, further comprising:
running the control thread to execute program code associated with the second task.

10. A method according to claim 8, further comprising:
running the control thread to determine if a third task of the first plurality of tasks or the second plurality of tasks is associated with coroutine execution or with task-specific thread execution;
if the third task is determined to be associated with coroutine execution, running the control thread to swap the coroutine context of the control thread with a coroutine context of the third task; and
if the third task is determined to be associated with thread execution, running the control thread to resume a thread associated with the third task and to suspend the control thread.

11. A non-transitory computer-readable medium storing program code executable by a processor, the program code comprising:
code to define a first plurality of tasks associated with coroutine execution, and a second plurality of tasks associated with task-specific thread execution;
code to spawn a plurality of threads, each of the plurality of threads associated with one of the second plurality of tasks;
code to run a control thread to determine if a first task of the first plurality of tasks or the second plurality of tasks is associated with coroutine execution or with task-specific thread execution;
code to run the control thread to swap a coroutine context of the control thread with a coroutine context of the first task, if the first task is determined to be associated with coroutine execution; and
code to run the control thread to resume a first thread associated with the first task and to suspend the control thread, if the first task is determined to be associated with thread execution.

12. A storage medium according to claim 11,
wherein the first task is a highest-priority runnable task of the first plurality of tasks and the second plurality of tasks.

13. A storage medium according to claim 11, the program code further comprising:
code to run the control thread to execute program code associated with the first task.

14. A storage medium according to claim 11, the program code further comprising:
code to run the first thread to execute program code associated with the first task.

15. A storage medium according to claim 11, the program code further comprising:
code to run the first thread associated with the first task to execute program code associated with the first task;
code to run the first thread to determine if a second task of the first plurality of tasks or the second plurality of tasks is associated with coroutine execution or with task-specific thread execution;
code to run the first thread to resume the control thread and to suspend the first thread, if the second task is determined to be associated with coroutine execution; and
code to run the first thread to resume a second thread associated with the second task and to suspend the first thread, if the second task is determined to be associated with thread execution.

16. A storage medium according to claim 15, the program code further comprising:
code to run the control thread to execute program code associated with the second task.

17. A storage medium according to claim 15, the program code further comprising:
code to run the second thread to execute program code associated with the second task.

18. A storage medium according to claim 11, the program code further comprising:
code to run the control thread to execute program code associated with the first task;
code to run the control thread to determine if a second task of the first plurality of tasks or the second plurality of tasks is associated with coroutine execution or with task-specific thread execution;
code to run the control thread to swap the coroutine context associated with the first task with the coroutine context of the second task, if the second task is determined to be associated with coroutine execution; and
code to run the control thread to swap the coroutine context of the first task with the coroutine context of the control thread, if the second task is determined to be associated with thread execution.

19. A storage medium according to claim 18, the program code further comprising:
code to run the control thread to execute program code associated with the second task.

20. A storage medium according to claim 18, the program code further comprising:
code to run the control thread to determine if a third task of the first plurality of tasks or the second plurality of tasks is associated with coroutine execution or with task-specific thread execution;
code to run the control thread to swap the coroutine context of the control thread with a coroutine context of the third task, if the third task is determined to be associated with coroutine execution; and
code to run the control thread to resume a thread associated with the third task and to suspend the control thread, if the third task is determined to be associated with thread execution.

21. A system comprising:
a database to store data; and
a database management system in communication with the database, the database management system to:
define a first plurality of tasks associated with coroutine execution, and a second plurality of tasks associated with task-specific thread execution;
spawn a plurality of threads, each of the plurality of threads associated with one of the second plurality of tasks;
run a control thread to determine if a first task of the first plurality of tasks or the second plurality of tasks is associated with coroutine execution or with task-specific thread execution;
run the control thread to swap a coroutine context of the control thread with a coroutine context of the first task, if the first task is determined to be associated with coroutine execution; and
run the control thread to resume a first thread associated with the first task and to suspend the control thread, if the first task is determined to be associated with thread execution.

22. A system according to claim 21, further comprising:
a cache copy to store a copy of a portion of the stored data,
wherein the stored copy is associated with the second plurality of tasks, and
wherein the stored data is associated with the first plurality of tasks.

23. A system according to claim 21, the database management system further to:
run the first thread associated with the first task to execute program code associated with the first task;
run the first thread to determine if a second task of the first plurality of tasks or the second plurality of tasks is associated with coroutine execution or with task-specific thread execution;
run the first thread to resume the control thread and to suspend the first thread, if the second task is determined to be associated with coroutine execution; and
run the first thread to resume a second thread associated with the second task and to suspend the first thread, if the second task is determined to be associated with thread execution.

24. A system according to claim 21, the database management system further to:
run the control thread to execute program code associated with the first task;
run the control thread to determine if a second task of the first plurality of tasks or the second plurality of tasks is associated with coroutine execution or with task-specific thread execution;
run the control thread to swap the coroutine context associated with the first task with the coroutine context of the second task, if the second task is determined to be associated with coroutine execution; and
run the control thread to swap the coroutine context of the first task with the coroutine context of the control thread, if the second task is determined to be associated with thread execution.

25. A system according to claim 24, the database management system further to:
run the control thread to execute program code associated with the second task;
run the control thread to determine if a third task of the first plurality of tasks or the second plurality of tasks is associated with coroutine execution or with task-specific thread execution;
run the control thread to swap the coroutine context of the control thread with a coroutine context of the third task, if the third task is determined to be associated with coroutine execution; and
run the control thread to resume a thread associated with the third task and to suspend the control thread, if the third task is determined to be associated with thread execution.

* * * * *